Patented Apr. 15, 1947

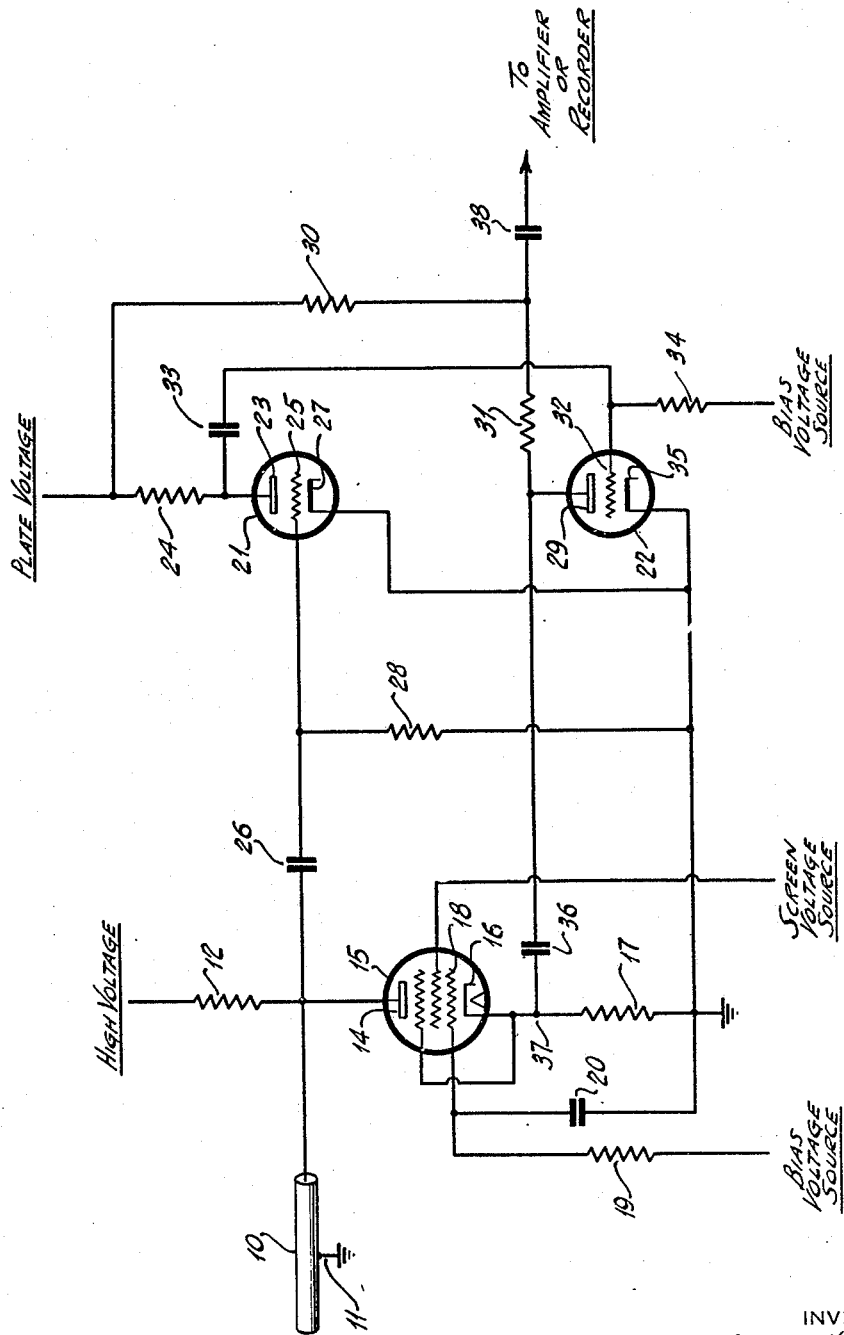

2,418,892

UNITED STATES PATENT OFFICE 2,418,892

RADIATION DETECTOR QUENCHING CIRCUIT

Arthur H. Lord, Jr., Houston, Tex., assignor to The Texas Company, New York, N. Y., a corporation of Delaware Application April 24, 1945, Serial No. 589,975

3 Claims. (Cl. 250—83.6)

The present invention relates to the operation of radiation detectors for use in the detection or detection and measurement of the intensity of penetrative radiations, for example, those emitted from radioactive materials. It relates more particularly to radiation detectors of the counter or pulse-producing type and to circuits for use in connection therewith.

Radiation detectors suitable for use in connection with the present invention are those of the counter or pulse-producing type, such as the Geiger-Muller counter or the high efficiency detectors described in the U. S. Letters Patent of Hare, No. 2,397,071 granted March 19, 1946, and of Hare and Herzog, No. 2,397,075 granted March 19, 1946. In the operation of such detectors, a high voltage is impressed across the electrodes of the detector, and when this voltage is in the proper operating range for the detector, the rate of pulse formation resulting from discharges within the counter is an indication of the intensity of the radiations to which the counter is subjected.

In order that a high rate of frequency of pulse formation may be accurately counted, it is important that there be a rapid recovery or quenching of the counter between pulses. Various circuits have hitherto been used to aid the quenching or recovery of such detectors, generally in connection with the amplification of the pulses. In those quenching circuits employing high vacuum electronic quench tubes, it is found that they are less effective at high pulse rates, the loss in effectiveness being due to the fact that with increasing frequency of pulse formation, there is a tendency for the voltage impressed across the detector electrodes to become lower. As a result such quenching circuits frequently fail to quench some proportion of the pulses produced by the detector and to respond to some of the pulses when the pulse rate is high. This not only results in loss in efficiency of the system, but also reduces the life of the counter.

In accordance with the present invention it has been possible to greatly improve the efficiency and life of the counter, and to secure adequate quenching even at a high frequency of pulses and with small pulse sizes. The invention will be more fully understood from the drawing in which a circuit embodying the present invention is illustrated.

In the drawing, a detector 10 of the counter or pulse-producing type is conventionally illustrated, its cathode being grounded through the conductor 11 and its anode being connected to a suitable source of high voltage through a resistor 12. The anode of the detector is also connected directly to the plate 14 of a high vacuum electronic tube or quenching tube 15 so that the same high voltage is impressed upon the plate 14 of tube 15 through resistor 12 as is impressed upon the anode of the detector. The cathode 16 of tube 15 is connected to ground through a cathode resistor 17. The tube 15 is thus in parallel to the detector. The control grid 18 of tube 15 is given a moderate negative bias voltage from a suitable source through resistor 19. In the embodiment illustrated the tube 15 is shown as a pentode, for example, of the 7C7 type. The suppressor grid is directly connected to the cathode and a suitable positive voltage is applied to the screen grid.

In the embodiment illustrated, two stages of amplification of the pulses from the detector are shown. The amplifying tubes illustrated are indicated as triodes. The first stage of amplification is provided by the tube 21 and the second stage by the tube 22. Preferably, high-mu tubes are employed or if desired, the tubes 21 and 22 may represent the units of a duplex triode, such as a 7F7 tube. A suitable operating voltage is impressed upon the plates of these tubes. In the case of plate 23 of tube or triode 21, this voltage is impressed through the resistor 24. The control grid 25 of tube 21 is coupled to the anode of the detector through the condenser 26, and the cathode 27 of tube 21 may suitably be grounded. The control grid 25 of tube 21 is grounded through grid resistor 28.

The plate 29 of the tube 22 or triode unit providing the second stage of amplification, has its operating voltage impressed upon it from the plate voltage source through resistors 30 and 31. The control grid 32 of tube 22 is coupled to the plate 23 of tube or triode unit 21 through the condenser 33. Since, as pointed out hereinafter, it is desirable that the tube 22 be biased somewhat beyond cutoff, a suitable source of negative voltage is provided, from which the desired bias voltage is impressed upon the grid 32 through resistor 34. The cathode 35 of tube 22 may be connected to ground.

In carrying out the present invention, a feed back coupling is provided from a point in the amplification system at which the pulses are negative to the cathode of the quenching tube 15. As pointed out hereinafter, the amplified pulses at the plate 29 of tube 22 in the system illustrated are negative and this plate is coupled through the condenser 36 to a point 37 in the connection between the cathode 16 of tube 15 and the cathode resistor 17.

Either positive or negative pulses, as desired, may be taken from the circuit illustrated, for further amplification or for the operation of indicating or recording means. In the circuit illustrated, negative pulses are taken from the plate 29 of tube or triode 22 and transmitted to an amplifying circuit or to indicating or recording means through the coupling condenser 38.

In operation, the necessary high voltage for operation of the detector is derived from a suitable high voltage source through load resistor 12 and is impressed across the electrodes of the detector and upon the plate of tube 15, which serves as a quenching tube. The tube 15, which is preferably a high-mu tube, is biased so that normally very little current passes through it.

The pulses produced within the detector 10 as a result of penetrative radiations from a radioactive source or of induced radiations, are transmitted through the coupling condenser 26 to the grid 25 of the tube or triode section 21. A suitable operating voltage is impressed upon the plate 23 of tube or triode unit 21 through the load resistor 24. Pulses reversed in phase appear at the plate of the tube 21, and are transmitted through the coupling condenser 33 to the control grid 32 of tube or triode unit 22, where they are again reversed in phase, appearing as negative pulses at its plate 29. In order to eliminate the effect of back wave resulting from condenser action, the tube 29 may be and preferably is operated beyond plate current cut-off. In order to hold the width of the pulses at a minimum, the coupling condensers in the amplifying system, that is, the condensers 26 and 33, are preferably of low capacity.

The negative pulses from the plate or the tube or triode unit 22 are fed back through the coupling condenser 36 to the cathode 16 of the quenching tube 15. The elimination of the effect of the back wave, as above referred to, tends to offset any tendency to oscillation resulting from the feedback of the pulses to the quenching tube.

As will be apparent, an effect of the negative pulses fed back to the cathode of the quenching tube 15 is to reduce the bias on the control grid relative to the cathode of this tube and thereby to aid in quenching the counter. At the same time, there is a slight degenerative effect which has a tendency to aid in maintaining the voltage across the counter. As pointed out hereinbefore, with greater frequency of pulse formation, there is a tendency for the average voltage across the electrodes to become lower resulting in a weakness of the pulses and in a failure to quench a larger proportion of the pulses. In the present system, the degenerative effect due to cathode resistor 17 tends to offset these effects and to aid in maintaining the voltage at a higher value for a given counting rate. The circuit of the present invention is sensitive to pulses of very small amplitude and hence the detector is quenched for substantially every pulse.

As a specific illustrative embodiment of the circuit described, with a high efficiency detector such as those hereinbefore referred to, the voltage impressed upon the anode of the detector and upon plate 14 of the tube 15 may be in the order of 1000 to 1100 volts and the resistance of resistor 12 is preferably relatively low to permit operation at high counting rates, say about .5 megohm. The tube 15 is suitably a high-mu tube such as a type 7C7 tube and its control grid is biased from a source of bias voltage of —3.5 volts, the resistance 19 being in the order of 1 megohm. A by-pass condenser 20 of the order of .1 microfarad capacity may be provided in connection with resistor 19. The resistance of cathode resistor 17 may be in the order of 2,000 ohms.

The tubes 21 and 22 are likewise high-mu tubes or triodes and may conveniently be the two units of a duplex triode, such as a 7F7 tube. The coupling condensers 26 and 33 are of low capacity, suitably in the order of .00005 microfarad. The operating voltage is applied to plates of the triode units 21 and 22 from a suitable source, say of 250 volts, the resistance of load resistor 24 being in the order of 50,000 ohms. The resistance of resistor 30 may be in the order of 25,000 ohms and that of resistor 31 in the order of 25,000 ohms, these two resistors in series constituting the load resistor for the plate 29 of the triode unit 22. The grid resistor 28 for the control grid 25 of the tube or triode unit 21 has a resistance in the order of .1 megohm. The bias voltage is impressed upon the control grid 32 of the tube or triode unit 22 from a suitable source of voltage of say —7 volts, the resistor 34 having a resistance in the order of .5 megohm. The capacity of the condenser 36 may be in the order of .002 microfarad and that of the condenser 38 in the order of .01 microfarad. It will be understood that these specific values are for purposes of illustration only and may be varied in accordance with the requirements of the system and the specific characteristics of the tubes employed.

The circuit of the present invention has been illustrated and described in the prior application of applicant and others, Ser. No. 574,870, filed January 27, 1945, of which the present application is a continuation-in-part.

The circuit of the present invention has been employed in radioactivity logging of oil wells, in which it has been used as a preamplifying and quenching circuit enclosed in the same instrument containing the radiation detector. It has also been employed in such devices as thickness measuring devices, for example, as shown in the patent to D. G. C. Hare No. 2,277,756, granted March 31, 1941, and the application, Ser. No. 579,870, above referred to. In such instruments, the casing of the instrument is in general to be regarded as the point of base or ground potential.

Although the invention has been described in connection with the specific details of an embodiment thereof, it is to be understood that these details are not to be regarded as limitations on the scope of the invention except in so far as they are included in the accompanying claims.

I claim:

1. In combination, a radiation detector of the counter type having its cathode grounded, a high vacuum electronic tube having its plate connected to the anode of said detector and having its cathode grounded through a cathode resistor, said tube serving as a quenching tube for said counter, amplifying means connected to receive and amplify pulses resulting from discharges within said detector, and means coupling the amplifying means to the cathode of said quench tube to transmit negative pulses thereto, whereby on a discharge in said detector, the flow of current through said quench tube is increased and rapid quenching of the detector is effected.

2. In combination, a radiation detector of the counter type, a high vacuum electronic tube connected in parallel across the electrodes of said detector, said tube serving as a quenching tube for said counter, amplifying means connected to receive and amplify pulses resulting from discharges within said detector, and means coupling the amplifying means to the cathode of said quench tube to transmit negative pulses thereto, whereby on a discharge in said detector, the flow of current through said quench tube is increased and rapid quenching of the detector is effected.

3. In combination, a radiation detector of the counter type having its cathode grounded, a high vacuum electronic tube having its plate connected to the anode of said detector and having its cathode grounded through a cathode resistor, said tube serving as a quenching tube for said counter, amplifying means connected to receive and amplify pulses resulting from discharges within said detector, said amplifying means including an amplifying unit biased beyond cutoff and from which negative pulses are derived, whereby the effects of back-waves are eliminated, and means transmitting the negative pulses derived from said amplifying unit to the cathode of said quench tube, whereby on a discharge in said detector, the flow of current through said quench tube is increased and rapid quenching of the detector is effected.

ARTHUR H. LORD, Jr.

REFERENCES CITED

The following references are of record in the file of this patent:

UNITED STATES PATENTS

| Number | Name | Date |
|---|---|---|
| 2,383,478 | Friedman et al. | Aug. 28, 1945 |